United States Patent [19]
Plichta et al.

[11] Patent Number: 5,730,390
[45] Date of Patent: Mar. 24, 1998

[54] REUSABLE SPACECRAFT

[75] Inventors: Peter Plichta; Walter Büttner, both of Düsseldorf, Germany

[73] Assignee: Klaus Kunkel, Dusseldorf, Germany

[21] Appl. No.: 553,355

[22] PCT Filed: Oct. 20, 1993

[86] PCT No.: PCT/EP93/02888

§ 371 Date: Nov. 13, 1995

§ 102(e) Date: Nov. 13, 1995

[87] PCT Pub. No.: WO95/11161

PCT Pub. Date: Apr. 27, 1995

[51] Int. Cl.⁶ .................................................. B64C 29/00
[52] U.S. Cl. ................... 244/23 C; 244/12.3; 244/23 R; 244/23 B
[58] Field of Search ........................ 244/12.2, 12.3, 244/23 C, 12.1, 23 R, 23 B

[56] References Cited

U.S. PATENT DOCUMENTS

| | | | |
|---|---|---|---|
| 2,395,435 | 2/1946 | Thompson et al. | 244/52 |
| 2,912,188 | 11/1959 | Singelmann et al. | 244/52 |
| 3,045,949 | 7/1962 | Stahmer | 244/12.3 |
| 3,083,935 | 4/1963 | Piasecki | 244/12.3 |
| 3,811,358 | 5/1974 | Morse . | |
| 4,023,751 | 5/1977 | Richard | 244/23 C |
| 4,824,048 | 4/1989 | Kim | 244/23 C |
| 4,938,814 | 7/1990 | Schoyer et al. . | |
| 4,955,962 | 9/1990 | Mell | 244/23 C |
| 5,149,012 | 9/1992 | Valverde | 244/23 C |
| 5,224,663 | 7/1993 | Criswell . | |
| 5,295,642 | 3/1994 | Palmer | 244/158 R |

FOREIGN PATENT DOCUMENTS

| | | | |
|---|---|---|---|
| 1 018 071 | 12/1952 | France . | |
| 1 129 038 | 1/1957 | France . | |
| 1231569 | 12/1966 | Germany | 244/23 R |
| 1 456 032 | 12/1968 | Germany . | |
| 2 231 008 | 1/1972 | Germany . | |
| WO 93/14973 | 8/1993 | WIPO . | |

Primary Examiner—Andres Kashnikow
Assistant Examiner—Tien Dinh
Attorney, Agent, or Firm—Herbert Dubno

[57] ABSTRACT

A reusable space craft having a disk-shaped casing which receives buoyancy upon horizontal travel through a gas atmosphere and three drive systems on the casing. A first drive system utilizes counter-rotating rotors driven by jet engines on the periphery. A second drive system utilizes a rocket rotor which can swing out from the both of the casing into an inclined position. The third drive system is a main thruster rocket at the center of the bottom fueled by an $Si_5$ to $Si_9$ silane propellant.

5 Claims, 3 Drawing Sheets

REUSABLE SPACECRAFT

CROSS REFERENCE TO RELATED APPLICATIONS

This application is a national stage of PCT/EP93/02888, filed Oct. 20, 1993.

1. Field of the Invention

The present invention is directed to a reusable spacecraft.

2. Background of the Invention

The mathematical constant e=2.718 ... controls physical processes. All attempts to leave the earth are determined by the rocket equation $$m = m_o \cdot e^{-v/w}$$

wherein $m_o$ is the weight of the completely fueled rocket, m is the pay-load remaining after combustion of the propellant, v is the achieved end velocity of the rocket and w is the discharge velocity of the rocket gases. Based upon this equation it is not possible to leave the earth with the chemical propellants presently existing without having to rely on a multi-stage principle.

Multi-stage rockets with liquid propulsion have the shape of superposed long cylinders, which prior to starting, are fueled in such a manner that they lift off the rocket launcher only very intricately. If only one of the bundled thrusters fails during lift-off the rocket drops back to earth and explodes. Another difficulty is that especially the thrusters of the first stage have to be steerable since a multi-stage rocket can be stabilized when lifting off the rocket launcher only by means of the rocket thrust.

Consequently, the first stage of the "Saturn 5" rocket used for the landing on the moon had a huge starting weight. The whole rocket is carried by the firepower of the rocket thrusters and raises its velocity only since the starting weight rapidly decreases because of the very high fuel consumption. Furthermore, after the burning out of the individual stages, the same either glow away as they drop back to the earth or can no more be caught back from the space.

The very high costs of such a space technique have caused the engineers to look for other possibilities. The American "Space Shuttle" represents a rocket aircraft which is hung onto a large fuel tank. In order to achieve a terrestrial orbit of a height of about 250 km, additionally two huge solid-fuel rockets are necessary. In contrast to the propellant tank which glows away when falling down, the outer shells of these solid rockets are again caught and are reused. However, this is technically rather critical since the reusable rocket shells form that part of this rocket system which is most susceptible to damage. The rocket aircraft itself can land on runways prepared therefor without any consumption of fuel. However, the expected reduction of costs from the reuse of the rocket aircraft has not occurred up to now.

The procedure proposed by Sänger et al of fastening a rocket aircraft on the back of a supersonic aircraft can be a very promising technical advance. According to this procedure, the supersonic aircraft provided with jets utilizes the oxygen of the terrestrial atmosphere so that for the first stage no liquid oxidizing agent has to be carried along. If it should be possible with such a supersonic aircraft to reach velocities of more than 5000 km/h, the principle of a reusable propulsion stage can be achieved. However, in contrast to the mother aircraft, the rocket aircraft carried in a pickaback manner is aerodynamically bulky since for the return to the earth a landing as with the Space Shuttle occurs. Thus it appears to be difficult to reach with such a rocket aircraft the necessary high velocities of the first propulsion stage within the atmosphere of the earth.

The methods described above are possibilities for transporting pay-loads into the space. However, landing and starting on gas-covered planets or satellites cannot be carried out. At most assembling of a landing rocket in space might be possible, which rocket reaches the earth under the influence of a braking flame stream, as with the manned moon ferry. However, in order to be able to start again, one or several unmanned landing ferries will have to be used which serve for the propellant supply and which, however, have to remain on the extraneous celestial bodies.

From GB 21 76 451 A a reusable spacecraft is already known. The outer shell of this spacecraft is configured as that, when flying obliquely through a gas atmosphere, buoyancy is generated. This spacecraft has a substantially elongated elliptic shape such that the spacecraft is brought into its transverse configuration during starting and landing while a tilting of 90° occurs during the normal climbing flight in the atmosphere so that the longitudinal axis of the spacecraft is aligned with the direction of the flying path. Although the spacecraft utilizes in a dexterous manner the atmosphere for buoyancy, it remains a rocket aircraft within the range of linear thinking since also in this case the logarithmic rocket equation based on e prevents that the missile from being brought onto a stationary orbit without using throw-away elements.

OBJECT OF THE INVENTION

The object of the invention is to provide a reusable spacecraft by means of which space trips within our solar system can be carried out without the use of throw-away elements and without the provision of special take-off and landing runways.

SUMMARY OF THE INVENTION

According to the invention this problem is solved by providing a reusable spacecraft for manned and/or unmanned space trips which has an outer casing which generates buoyancy when horizontally flying through a gas atmosphere, and three drive systems disposed in the interior of the disk-shaped outer casing, namely,

- a jet arrangement located at the periphery of the spacecraft and having a plurality of jets which act on two oppositely driven rings through corresponding transmissions, wherein these blade rings are closable by means of a metal ring forming the edge portion of the outer casing, the metal ring consisting of a plurality of individual ring segments which are outwardly movable in radial direction by means of extendable hydraulic cylinders, at least one rocket drive slanted sideways and foldable out of the bottom of the disk-shaped outer casing, the spacecraft being liftable as flying body up to the edge of the terrestrial stratosphere by said rocket drive, and
- at least one main thruster centrally located with respect to the disk-shaped outer casing and adapted to move the spacecraft through the vacuum space, wherein the main thruster and preferably also the rocket drive are designed in such manner that they are adapted to be driven by a silane oil of the chemical formula $Si_5H_{12}$ to $Si_9H_{20}$ as rocket propellant.

Preferred embodiments of the invention comprise outlet openings of the rocket drives which are adapted to be closed by flaps located within the outer casing.

Liquid oxygen, chlorine, fluorine and/or mixtures of these substances can be fed to the main thruster.

The jets of the jet arrangement are formed in such a manner that a liquid oxidant, as for instance tetranitromethane, can be fed to these jets when the spacecraft entering a hydrogen, methane or ammonia-containing atmosphere.

Since the natural constant e is correlated with π by means of the Euler equation $$e^{2\pi \cdot i} = 1$$

the idea is relevant that the rocket equation can only be circumvented in an effective manner if a spacecraft has a circular construction.

On account of such a construction the inventive spacecraft can be operated in three different phases during starting and landing.

During a first phase the disk-shaped spacecraft is lifted off the ground by means of jets which drive an annular casing surrounding the disk. This is realized by two opposite turbine blade rings which can be hydraulically opened and closed by means of another casing. Accordingly, in this first phase of the space flight the spacecraft works as a helicopter so that no special take-off and landing runaways are necessary.

In the following second phase the disk-shaped spacecraft is accelerated horizontally through the atmosphere by means of a rocket drive which is foldable out. Accordingly, on account of the resulting buoyancy the jets used during the first phase can be switched off with closure of the casing. While the atmospheric pressure decreases in an exponential manner with regard to the base e with increasing height, the buoyancy is maintained by a corresponding increasing of the velocity. In this manner the spacecraft can be accelerated to a velocity of about 6000 to 8000 km/h and a flying height of about 50 to 80 km. Furthermore, a relatively large amount of the rocket can still be present for the following or third phase. Preferably, liquid hydrogen is used as the propellant for conventional rockets on account of its lowest specific weight. Since the airjacket carries the weight of the disk-like aircraft within the first and second phases, large amounts of a very heavy propellant can be accelerated to the necessary velocity of 6000 to 8000 km/h.

In order to reach space, the spacecraft requires a single rigid main thruster mounted at the bottom thereof during the following third phase. Since here the logarithmic rocket equation becomes valid again, within the scope of the invention a heavier propellant, namely silane oil, is used which is burned at first with liquid oxygen and later with liquid flourine. Silane oils are the silicone Diesel oils with hydrosilicons having 5, 6, 7, 8 or 9 silicon atoms, respectively. Up to 1970 these substances were considered unpreparable; Subsequently the preparation was achieved by one of the inventors. Silane oils appear of interest as rocket propellants since with increasing number of silicon atoms the proportion of hydrogen decreases in the higher silanes. According to the impulse equation not only the velocity of the rocket gases but also the mass thereof is decisive. The molecular weight of silicon tetrafluoride is nearly six times as high as that of water which is generated during the combustion of hydrogen. If liquid hydrogen is burned instead of silane oil much more propellant will have to be taken along which would influence the volume of the spacecraft.

The already mentioned fire power of solid rockets is substantially increased, as is known, by additives of aluminum powder or powder-like metal hydrides. Solid rockets have the great disadvantage that they cannot be switched off after they have been ignited once. For the shuttle technique, this has the effect of enormous danger to passengers. In the periodic system of elements silicon is located directly to the right of aluminum. The phosphorus to the right of silicon does not form any liquid higher phosphanes. Since the hydrides of long-chain silicon atoms are pumpable, the advantage of a solid rocket and the possibility of switching off of a liquid rocket are combined by the use of the element silicon as the basis for the propellant.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
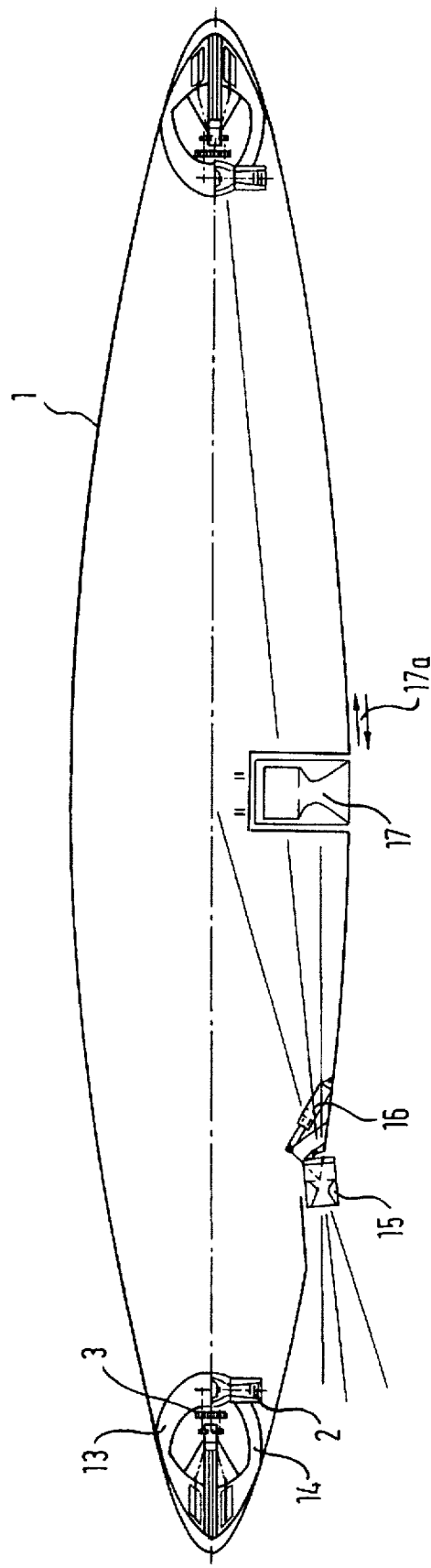
FIG. 1 is a diagrammatic side view of the reusable spacecraft according to the invention.

The reusable spacecraft of FIG. 1 provided according to invention has a disk-shaped outer casing 1 which is configured in such a manner that buoyancy is generated when the casing obliquely flies through a gaseous medium.

At the periphery of the spacecraft a plurality of jets 2, preferably four in number, offset with respect to another by 90°, are provided which, through corresponding transmissions 4a, 5a, drive in opposite rotational senses two rings 4 and 5 guided along the whole periphery of the spacecraft on which angularly adjustable rotor blades 6 are fastened. These rotor blades 6, in the kind of an impeller, form two blade rings 7 and 8 with which a downwardly directed airstream can be generated.

Figure 2:
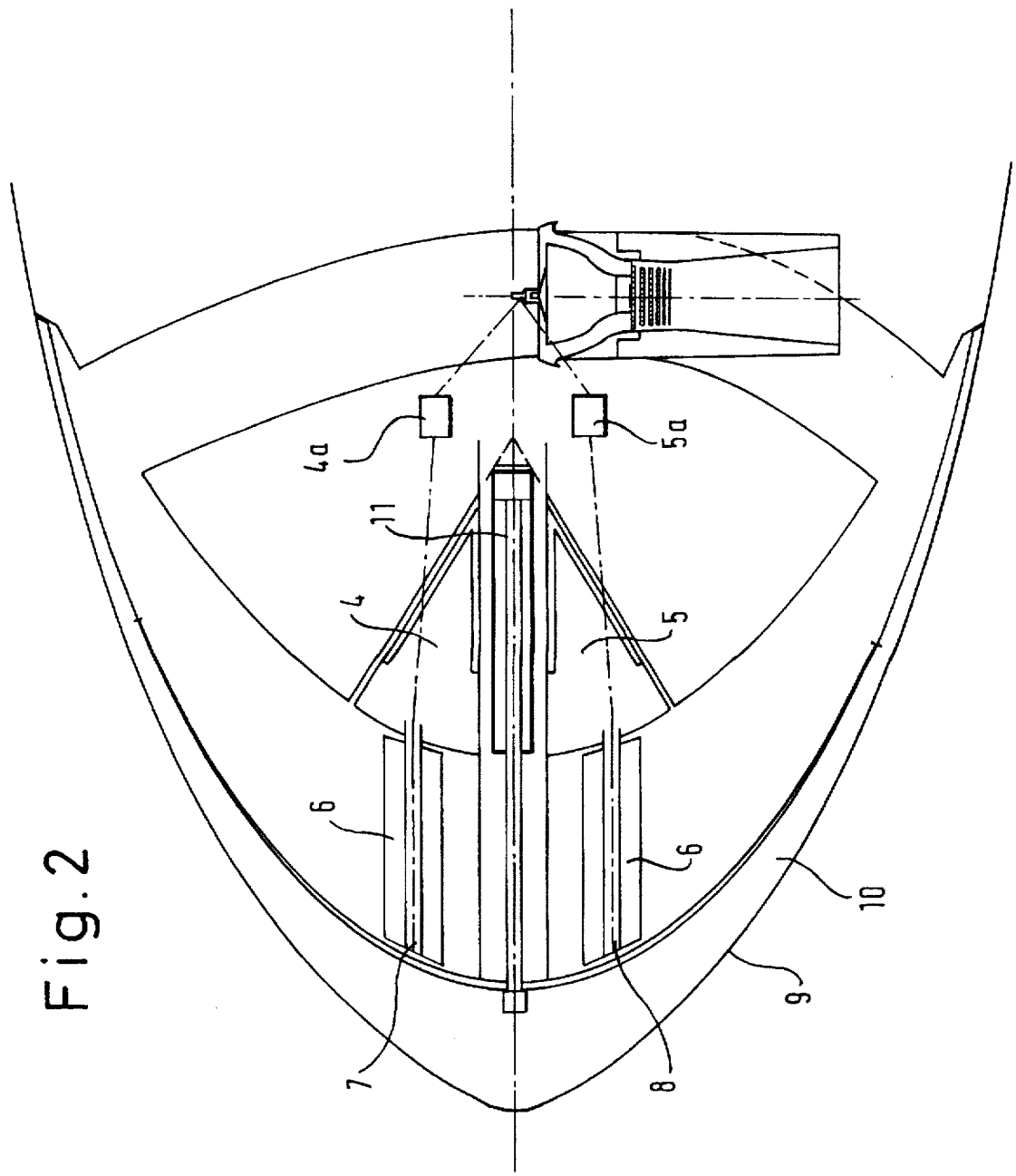
FIG. 2 is an enlarged detailed view, in diagrammatic form of a portion of the spacecraft of FIG. 1 in the condition of an outer closing of the opposite blade rings.
Figure 3:
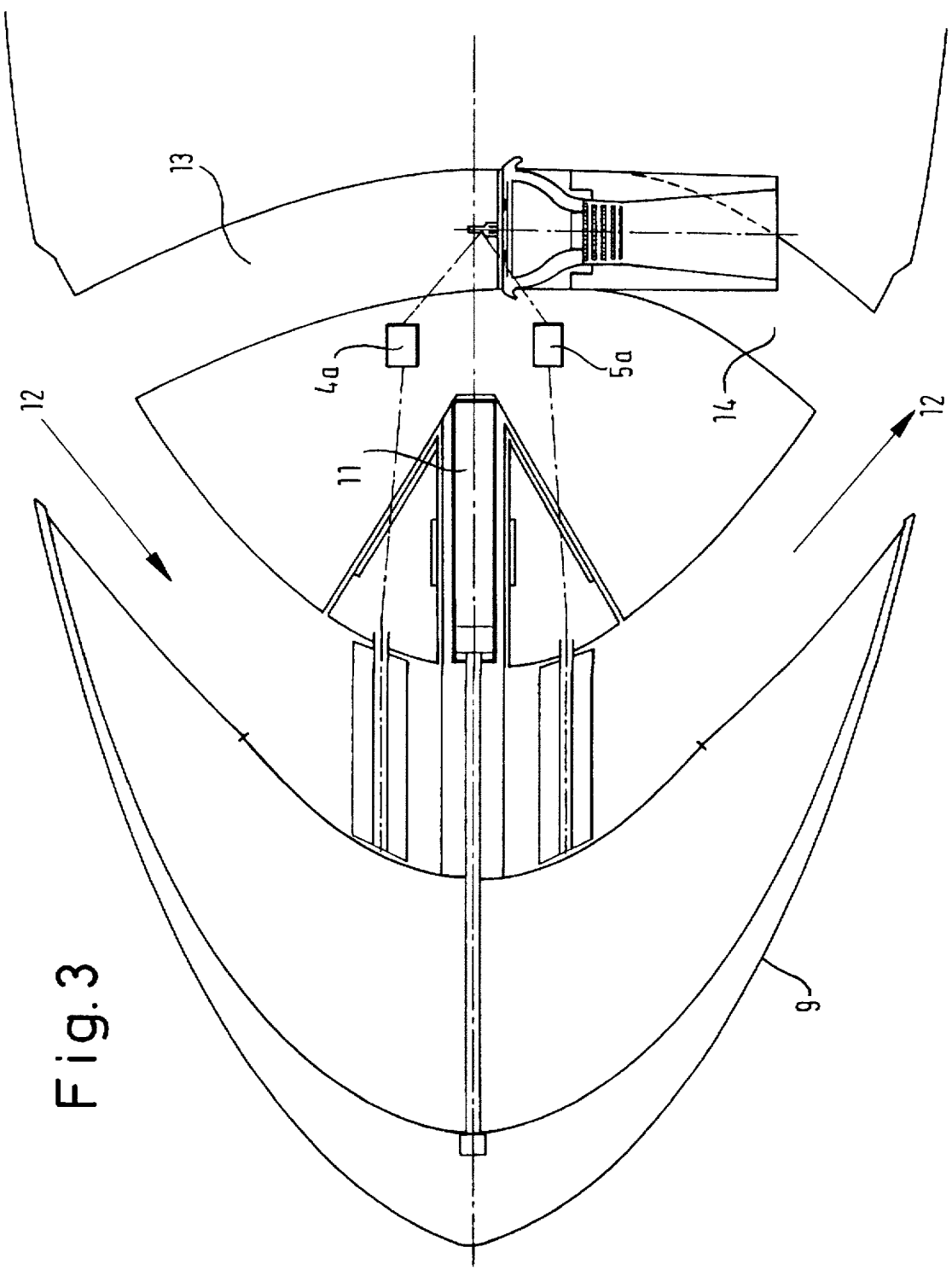
FIG. 3 is an enlarged schematic detail view, similar to FIG. 2, in the condition of the outwardly opened opposite blade rings.

According to FIG. 2, these two blade rings 7 and 8 are closed by a casing ring 9 continuously merging into the outer casing 1. This casing ring 9 consists of a plurality of ring segments 10, preferably 12, which are movable into an extended position shown in FIG. 3 by means of corresponding hydraulic cylinders 11. In this manner a substantially vertically extending ring slot 12 is formed along the periphery of the spacecraft by means of which the airstreams generated by the two blade rings 7 and 8 are directed from the upper side of the outer casing 1 to the lower side. The slots between the individual ring segments 10 resulting when the ring segments 10 are extended are closed by laterally movable closing members so that the desired annular structure of the casing ring 9 is maintained even in the extended condition of the ring segment 10. Besides, the jets 2 provided in the peripheral range of the spacecraft are provided with corresponding inlet and outlet channels 13 and 14 which open into the existing annular slot 12 according to FIG. 1 whereby the amounts of air transported by the two blade rings 7 and 8 are increased towards the lower side of the spacecraft.

A rocket drive 15 is provided in the region of the lower surface of the disk-shaped spacecraft. After the opening of a corresponding flap by means of a hydraulic cylinder 16, the rocket drive can be turned into an inclined downwardly directed position. This rocket drive 15 is provided with a steerable suspension in order to enable the steering of the whole spacecraft.

Finally, according to FIG. 1 the inventive spacecraft has still in its lower central area a main thruster 17 the outlet opening of which can be closed by means of a flap 17a provided within the outer casing 1.

The inventive spacecraft operates in the following manner: With the spacecraft being in the rest position on foot rests which are not shown, at first the ring segments 10 forming the casing ring 9 are moved to their outer position by means of the hydraulic cylinder 11, whereupon the jets 2 provided along the periphery of the spacecraft are operated. Through the transmissions 3 the two rings 4 and 5 with the corresponding blade rings 7 and 8 are thereby oppositely rotated, whereby a downwardly directed airstream is generated through the formed annular slot 12 which airstream is still enlarged by the hot gases discharged by the jets 2 along the outlet channels 14. In this manner the spacecraft is lifted off the ground in the manner of a helicopter. In contrast to a multi-stage rocket in the form of a cylinder the disk-shaped spacecraft is not carried by the thrust of bundled rocket drives but by the atmospheric gases. The consumption of propellant for the turbines is comparable low.

While the spacecraft is floating over the ground the rocket drive 15 excentrically arranged in the bottom area of the outer casing 1 is turned into the position shown in FIG. 1 by means of the hydraulic cylinder 16 and is driven The spacecraft is laterally accelerated by means of this rocket drive 15. Still before reaching sonic speed the rotor blades of the rotor rings 7 and 8 can be positioned horizontally since now the aerodynamic shape of the outer casing 1 supplies the necessary buoyancy with increasing velocity. The jets 2 are switched off at a velocity of about 1000 km/h and a flight height of about 5 km. The after-running of the blade rings 7 and 8 stabilizes the spacecraft. The annular segments 10 are withdrawn by means of the hydraulic cylinders 11 so that the metal ring 9 merges into the outer casing 1 in a continuous manner. Now, an aerodynamically ideal rocket aircraft has developed from the spacecraft which operated as a rocket helicopter up to now. The spacecraft can be accelerated to a velocity of about 6000 km/h by means of the rocket drive 15. The atmospheric pressure substantially exponentially decreasing with increasing flight height is compensated by the increasingly higher velocity of the spacecraft so that a flight height of about 50 km can be reached in this manner through the oblique flight.

After the present atmospheric pressure has fallen to very low values and a buoyancy through the outer configuration of the outer casing 1 is no longer attainable even at very high velocities, the rocket drive 15 is turned back into its original position by means of the hydraulic cylinders 16, and the aperture present in the outer casing 1 is closed by means of a flap which is not shown. Simultaneously the main thruster 17 disposed along the central axis of the spacecraft on the bottom thereof is ignited so that in this phase of the drive the disk-shaped spacecraft is lifted into the space in the kind of a normal rocket. The velocity of the spacecraft can be increased from about 6000 km/h to 30000 km/h by means of this main thruster 17 which appears to be sufficient for space operations with low orbits.

However, in order to be able to reach higher, for instance stationary orbits, it is provided within the scope of the present invention that silane oils as rocket propellant are fed to the two rocket drives 15 and 17. In this connection it is to be mentioned that the liquid silanes discovered by Alfred Stock, namely trisilane and n-tetrasilane, have been chlorinated for the first time in 1968 (see F. Fehér, P. Plichta, R. Guillery in "Inorganic Chemistry", vol. 10, no. 3, March 1971), whereby these energy-rich silanes became chemically controllable. Up to this date all the attempts of A. Stock et al have failed on account of vehement explosions. Indeed, it has been already suggested until now to use the simply preparable gases monosilane and disilane as rocket propellants. All the four silanes known up to 1970,namely

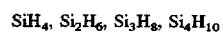

are self-igniting and so unsafe with regard to handling that their use as rocket propellant is excluded. In 1970 the higher silanes, i.e the Diesel oils of a silicon base, were prepared for the first time pyrolyrically from lower silanes, and the silane oil mixture was decomposed preparatively gaschromatographically into the n-silanes and iso-silanes of the formulas

by one of the present applicants, P Plichta. Surprisingly, it was observed that these higher silanes are preparable through heat (see DE-PS2 139 155). However, the fact that the Silanes with higher chain length starting from n-heptasilane are no longer self-igniting was even more surprising. In this manner it is possible on a commercial scale to prepare trisilane and tetrasilane, which are thereafter converted into higher silane oil mixtures safe with regard to handling, from the raw products magnesium, silicon and sulphuric acid.

Tests by the applicants have shown that the combustion of silanes with higher chain length with liquid oxygen, liquid chlorine or fluorine results in combustion temperatures which are much higher than those of a hydrogen-oxygen burner. While the carbon-containing Diesel oil burns off with soot emissions, for instance, heptasilane oil burns with the output of a flash. Furthermore, heptasilane oil is chemically not aggressive in contrast to hydrazine and the derivatives thereof.

The use of the silane oils as rocket propellant has the advantage of a relatively high molecular mass of the combustion products in addition to the advantage of higher combustion temperatures. That is, according to the impulse equation $$p = m \cdot v$$

for the thrust of the rocket not only the velocity of the discharged gases is of importance but also the molecular mass of the combustion products discharged at correspondingly high temperatures. So, the molecular masses of $H_2O$ and $CO_2$ are, for instance, 18 and 44. In contrast to this, $SiO_2$ has a molecular mass of 60 while the molecular mass of $SiF_4$ is 104. These molecular masses can be further increased by the co-combustion of chlorine not only with the combustion of oxygen but also with the combustion of fluorine.

Compared with the rocket motors used today, a thruster burning silane oil with liquid oxygen is at least twice as powerful. The two mentioned components silane oil and liquid oxygen can be used in connection with the rocket drive 15 foldable out of the inventive spacecraft. Only the non-toxic reaction products silicon dioxide and water as well as traces of red-brown amorphous silicon monoxide are generated which can be discharged into the terrestrial atmosphere without problems. The centrally located main thruster 17 should be also operated with silane oil and liquid oxygen at the beginning. However, with increasing flight height additionally liquid chlorine can be added as oxidant. Finally, from a flight height of more than 1000 km liquid fluorine can be used as oxidant. Silane oil and fluorine are the most energy-rich chemical propellants which can be imagined at all. The combustion products silicon tetrafluoride and hydrogen fluoride are very toxic which, however, appears to be not problematic with very high flight heights since the discharged combustion products re carried away by the solar wind in the space.

Indeed, with the energy-rich propellants to be used within the scope of the invention the physical laws of the rocket equation cannot be abolished. However, a stationary terrestrial orbit can be reached substantially in a one-stage manner by a dexterous combination of thruster technique and rocket technique as it is used within the scope of the present invention. In this flight height the inventive spacecraft could be refueled for a second time, whereby a landing and starting ferry is developed with which planets and moons having a gas jacket can be headed, wherein the ferry can be braked by means of the configuration of the outer casing 1.

In order to carry out a reascent, the gas jacket of the corresponding stellar body should either contain oxygen or burnable gas portions. In this case the possibility results that the jets 2 of the inventive spacecraft are designed in such a manner that they suck from outside hydrogen, methane, cyanehydrogen, ammonia or other gases while simultaneously a liquid oxidant, as for instance tetranitromethane, carried along in the spacecraft is introduced so that an exothermic oxidation process can take place in the corresponding jets 2 in the desired manner.

In order to be able to land on gas-covered planets or moons, the outer casing 1 of the inventive spacecraft should be armoured with silicon ceramics at its lower side. Furthermore, the possibility should be present to completely close the outlet aperture of the main thruster 17 which is located at the lower side.

As far as possible beryllium alloys should be used for the construction of the inventive spacecraft. Only in this manner can the starting weight be kept at a minimum. The costs of such alloys appear to be acceptable since the inventive spacecraft can be completely reused. Furthermore, the fact is advantageous that the two rocket drives 15 and 17 can be switched off at any point of time which would mean the crash and the complete destruction with a conventional rocket. Even at a breakdown of all the drive means the inventive spacecraft can be brought to a soft emergency landing on its non-shown foot rests by autorotation of the two blade rings 7 and 8.

We claim:

1. A reusable spacecraft, comprising:
   a disk-shaped casing configured to generate buoyancy in horizontal travel through a gas atmosphere;
   a first drive system on said casing including:
      a pair of counter-rotating rotors along a periphery of said casing,
      a plurality of jet engines spaced about the periphery and operatively connected to said counter-rotating rotor for driving same,
      a plurality of ring segments along said periphery shiftable radially relative to said casing between closed positions in which said ring segments form a closed ring enclosing said rotor and an open position outwardly of said casing wherein a passage is formed between upper and lower surfaces of said casing and within which said rotors are provided, and
      means for displacing said segments between said positions;
   a second drive system on said casing including:
      at least one rocket motor swingably mounted on an underside of said casing and adapted to swing out of said casing into an inclined position for driving said casing through said gas atmosphere at a velocity sufficient to generate said buoyancy, and
      means for swinging said rocket motor into and out of said casing; and
   a third drive system on said casing including:
      a main rocket thruster opening centrally of said casing downwardly at said underside of said casing, said rocket motor and said main rocket thruster being operated with an $Si_5$ to $Si_9$ liquid silane propellant.

2. The reusable spacecraft defined in claim 1 wherein said rocket motor and said main rocket thruster have outlet openings, said spacecraft further comprising at least one flap for closing at least one of said openings.

3. The reusable spacecraft defined in claim 1 wherein liquid oxygen, chlorine, fluorine or a mixture thereof is fed to said main rocket thruster.

4. The reusable spacecraft defined in claim 1 wherein said jet engines are constructed and arranged for feeding a liquid oxidant to said jet engines upon travel of the spacecraft through a hydrogen, methane or ammonia atmosphere.

5. The reusable spacecraft defined in claim 4 wherein said liquid oxidant is tetranitromethane.

* * * * *